US012736899B2

(12) United States Patent
Kiriyama et al.

(10) Patent No.: US 12,736,899 B2
(45) Date of Patent: Sep. 15, 2026

(54) TONER SEAL MEMBER AND TONER CARTRIDGE

(71) Applicants: INOAC CORPORATION, Nagoya (JP); INOAC SLIMFLEX CO., LTD., Nagoya (JP)

(72) Inventors: Takuya Kiriyama, Aichi (JP); Kento Uchida, Aichi (JP)

(73) Assignees: INOAC CORPORATION, Nagoya (JP); ROGERS INOAC CORPORATION, Nagoya (JP)

( * ) Notice: Subject to any disclaimer, the term of this patent is extended or adjusted under 35 U.S.C. 154(b) by 0 days.

(21) Appl. No.: 18/873,778

(22) PCT Filed: Jun. 6, 2023

(86) PCT No.: PCT/JP2023/020985
§ 371 (c)(1),
(2) Date: Dec. 11, 2024

(87) PCT Pub. No.: WO2023/248782
PCT Pub. Date: Dec. 28, 2023

(65) Prior Publication Data

US 2025/0377613 A1 Dec. 11, 2025

(30) Foreign Application Priority Data

Jun. 21, 2022 (JP) ................................ 2022-099821

(51) Int. Cl.
*G03G 15/08* (2006.01)
*B32B 5/00* (2006.01)
(Continued)

(52) U.S. Cl.
CPC ........... *G03G 15/0898* (2013.01); *B32B 5/18* (2013.01); *B32B 5/22* (2013.01); *B32B 9/046* (2013.01);
(Continued)

(58) Field of Classification Search
CPC ........... G03G 15/0817; G03G 15/0881; G03G 15/0882; G03G 15/0884; G03G 15/0886;
(Continued)

(56) References Cited

U.S. PATENT DOCUMENTS 6,406,782 B2 * 6/2002 Johnson .................. B32B 27/40 428/317.1
7,711,284 B2 * 5/2010 Ichikawa ........... G03G 15/0225 399/102
(Continued)

FOREIGN PATENT DOCUMENTS

CN 106662830 A 5/2017
JP 63-147186 A 6/1988
(Continued)

OTHER PUBLICATIONS

International Search Report issued Aug. 15, 2023 in International Application No. PCT/JP2023/020985.
(Continued)

*Primary Examiner* — Robert B Beatty
(74) *Attorney, Agent, or Firm* — Sughrue Mion, PLLC

(57) ABSTRACT

A toner seal member excellent in abrasion resistance. A toner seal member includes a foam layer and a coating layer, and the coating layer is exposed. The coating layer is produced using a polyol, an isocyanate, a photopolymerizable monomer having a hydroxyl group, and a silicone resin as raw materials.

11 Claims, 3 Drawing Sheets

(51) Int. Cl.
*B32B 5/18* (2006.01)
*B32B 5/22* (2006.01)
*B32B 9/04* (2006.01)

(52) U.S. Cl.
CPC ...... *G03G 15/0881* (2013.01); *B32B 2250/02* (2013.01); *B32B 2255/102* (2013.01); *B32B 2581/00* (2013.01); *G03G 2221/1648* (2013.01)

(58) Field of Classification Search
CPC ........... G03G 15/0894; G03G 15/0898; G03G 2215/0692; G03G 2215/069; G03G 2215/0687; G03G 2215/0877; G03G 2215/088; G03G 2215/0883; G03G 2221/1648; B32B 5/18; B32B 5/22; B32B 5/32; B32B 9/046; B32B 27/36; B32B 27/365; B32B 2250/02; B32B 2255/10; B32B 2255/102; B32B 2581/00
USPC ......................... 399/102, 103, 105, 106, 262
See application file for complete search history.

(56) References Cited

U.S. PATENT DOCUMENTS 8,376,922 B2 2/2013 Akama et al.
8,550,968 B2 10/2013 Sugimura et al.
2007/0111874 A1 5/2007 Sugimura et al.
2008/0292366 A1 11/2008 Akama et al.
2011/0124478 A1* 5/2011 Tagawa .............. G03G 15/2053 492/56
2013/0302070 A1* 11/2013 Oosaku ................... F16C 13/00 399/286
2020/0064754 A1* 2/2020 Sano .................. G03G 15/1685
2025/0370380 A1* 12/2025 Uchida .............. G03G 15/0898

FOREIGN PATENT DOCUMENTS

JP 2002-214895 A 7/2002
JP 2004-35600 A 2/2004
JP 2006-272811 A 10/2006
JP 2007-133223 A 5/2007
JP 2009-265425 A 11/2009
JP 2012-71421 A 4/2012
JP 2016-186039 A 10/2016
JP 2021-17513 A 2/2021
WO 2006/001171 A1 1/2006

OTHER PUBLICATIONS

International Preliminary Report on Patentability issued Jul. 2, 2024 in International Application No. PCT/JP2023/020985.
Office Action issued Jul. 11, 2026 in Chinese Patent Application No. 202380044129.X.

* cited by examiner

TONER SEAL MEMBER AND TONER CARTRIDGE

CROSS-REFERENCE TO RELATED APPLICATIONS

This is a National Stage of International Application No. PCT/JP2023/020985 filed Jun. 6, 2023, claiming priority based on Japanese Patent Application No. 2022-099821 filed Jun. 21, 2022.

TECHNICAL FIELD

The present disclosure relates to a member and a toner cartridge.

BACKGROUND ART

Patent Literature 1 discloses a seal member including a sheet-like elastic member and a coating layer. Patent Literature 2 discloses a toner seal member including a urethane foam layer and a urethane film layer.

CITATIONS LIST

Patent Literature

Patent Literature 1: JP 2002-214895 A
Patent Literature 2: JP 2009-265425 A

SUMMARY OF INVENTION

Technical Problems

Recently, a member such as a toner seal member has been required to have various performances, and the requirements have also become severe. For example, a member having excellent abrasion resistance is required.

An object of the present disclosure is to provide a member excellent in abrasion resistance.

The present disclosure can be implemented in the following form.

Solutions to Problems

[1] A member including a foam layer and a coating layer, the coating layer being exposed, Wherein the coating layer is produced using a polyol, an isocyanate, a photopolymerizable monomer having a hydroxyl group, and a silicone resin as raw materials.

Advantageous Effects of Invention

The present disclosure can provide a member excellent in abrasion resistance.

BRIEF DESCRIPTION OF DRAWINGS

FIG. 2 is a partial sectional view of a toner cartridge according to an embodiment when a discharge port is in a closed state.

FIG. 3 is a partial sectional view of the toner cartridge of FIG. 2 when the discharge port is in an open state.

DESCRIPTION OF EMBODIMENTS

Figure 1:
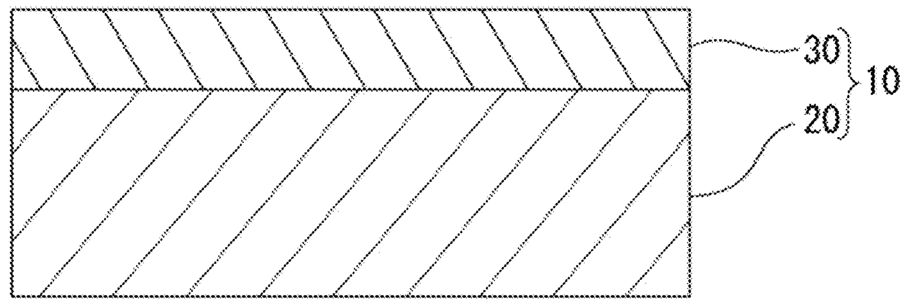
FIG. 1 is a sectional view of a member according to an embodiment.

Hereinafter, the present disclosure will be described in detail. In the present specification, the description using "to" for a numerical range includes the lower limit value and the upper limit value unless otherwise specified. For example, the expression "10 to 20" includes both the lower limit value "10" and the upper limit value "20". That is, "10 to 20" has the same meaning as "10 or more and 20 or less".

1. Member

FIG. 1 is a sectional view of a member 10 according to an embodiment. The member 10 includes a foam layer 20 and a coating layer 30. In the member 10, the coating layer 30 is exposed. For example, the member 10 is a laminated body of the foam layer 20 and the coating layer 30. For example, the coating layer 30 is a skin layer. The member 10 is, for example, a toner seal member.

[Foam Layer]

The foam layer 20 is made of, for example, a synthetic resin foam. Examples of the foam layer 20 include synthetic resin foams including polyurethane foams; polyolefin foams such as polyethylene foams and polypropylene foams; polystyrene foam; polyamide foam; polyester foams such as polyethylene terephthalate (PET) foams and polybutylene terephthalate (PBT); (meth)acrylic foams; phenol foams; polyvinyl chloride foams; polyimide foams; silicone resin foams; urea resin foams; melamine resin foams; ethylene propylene diene rubber (EPDM) foam; styrene-butadiene rubber (SBR) foams; nitrile butadiene rubber (NBR) foams; ethylene-vinyl acetate copolymer (EVA) foams; ethylene-acrylic acid copolymer foams; and ethylene-ethyl acrylate copolymer (EEA) foams. Among these foams, polyurethane foams are more preferable from the viewpoint of adhesion to the coating layer 30.

[Coating Layer]

The coating layer 30 is produced using a polyol, an isocyanate, a photopolymerizable monomer having a hydroxyl group, and a silicone resin as raw materials. The coating layer 30 may be produced on a surface of the foam layer 20 using a composition containing a urethane prepolymer obtained by causing a polyol, an isocyanate, and a photopolymerizable monomer having a hydroxyl group to react with each other, and a silicone resin (more specifically, particles of silicone resin). The coating layer 30 preferably contains particles of silicone resin (hereinafter, also referred to as filler).

The urethane prepolymer has a photoreactive group at a terminal and contains a polyester bond in a polymer skeleton. Here, the photoreactive group is a functional group that can be crosslinked through irradiation with X-rays, electron beams, ultraviolet rays, visible rays, or the like. More specifically, the urethane prepolymer is obtained by reacting a reactant of a polyisocyanate and a polyol with a photoreactive group-containing compound (compound having a photoreactive group capable of reacting with a terminal of the reactant). Hereinafter, various raw materials used in producing the urethane prepolymer will be described.

[Polyol]

The polyol is not particularly limited. The polyol preferably contains at least one of a polyester polyol and a polycarbonate polyol.

Examples of the polyester polyol include: a polyester polyol obtained through a dehydration condensation reaction of an aliphatic dicarboxylic acid (for example, succinic acid, adipic acid, sebacic acid, and azelaic acid), an aromatic dicarboxylic acid (for example, phthalic acid, terephthalic acid, isophthalic acid, and naphthalenedicarboxylic acid), an alicyclic dicarboxylic acid (for example, hexahydrophthalic acid, hexahydroterephthalic acid, and hexahydroisophthalic acid), or an acid ester or an acid anhydride thereof with ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol (MPD), neopentyl glycol, 1,8-octanediol, 1,9-nonanediol, or the like, or a mixture thereof, such as such as polypropylene glycol; and polylactone diols obtained through ring-opening polymerization of lactone monomers such as ε-caprolactone and methylvalerolactone.

The polyester polyol is preferably one obtained through a condensation reaction of 3-methyl-1,5-pentanediol (MPD) with terephthalic acid or one obtained through a condensation reaction of 3-methyl-1,5-pentanediol (MPD) with adipic acid.

Next, the polycarbonate polyol will be described. The polycarbonate polyol is preferably a polycarbonate diol. The polycarbonate diol is obtained, for example, by causing a diol component to react with a carbonylating agent. Examples of the diol component include aliphatic diols, alicyclic diols, ester diols, and aromatic diols. Examples of the aliphatic diol include 3-methyl-1,5-pentanediol, 1,6-hexanediol, 1,4-butanediol, and diethylene glycol, and these may be used singly or in combination of two or more thereof. Examples of the alicyclic diol include 1,4-cyclohexanediol. Examples of the ester diols include bis(hydroxyethyl)terephthalate. Examples of the aromatic diol include aromatic diols such as alkylene oxide adducts of bisphenol A. Examples of the carbonylating agent include diethyl carbonate, ethylene carbonate, propylene carbonate, dimethyl carbonate, dibutyl carbonate, diphenyl carbonate, diphenyl carbonate, and phosgene.

The polycarbonate polyol is preferably one obtained by causing 3-methyl-1,5-pentanediol (MPD), 1,6-hexanediol, and diethyl carbonate to react with each other. The ratio between 3-methyl-1,5-pentanediol (MPD) and 1,6-hexanediol is preferably 9.5:0.5 to 8:2, and more preferably 9:1.

The polyol is preferably one obtained through a condensation reaction of 3-methyl-1,5-pentanediol (MPD) and adipic acid.

The hydroxyl value of the polyol is preferably 10 to 1000 mgKOH/g, more preferably 20 to 500 mgKOH/g, and still more preferably 30 to 300 mgKOH/g. Here, the hydroxyl value is a value measured according to JIS-K0070.

When the total amount of the polyol, the isocyanate, and the photopolymerizable monomer having a hydroxyl group is 100 parts by mass, the amount of the polyol is preferably 50 parts by mass or more and 90 parts by mass or less, more preferably 55 parts by mass or more and 85 parts by mass or less, still more preferably 60 parts by mass or more and 80 parts by mass or less.

[Isocyanate]

The isocyanate (polyisocyanate) is a compound having a plurality of isocyanate groups, and for example, aromatic isocyanates such as 4,4-diphenylmethane diisocyanate (MDI), tolylene diisocyanate (TDI), 1,5-naphthalene diisocyanate (NDI), triphenylmethane triisocyanate, and xylylene diisocyanate (XDI); alicyclic isocyanates such as isophorone diisocyanate (IPDI) and dicyclohexylmethane diisocyanate; aliphatic isocyanates such as hexamethylene diisocyanate (HDI); free isocyanate prepolymers obtained through the reaction of these with a polyol; and modified isocyanates such as carbodiimide-modified isocyanates can be used. Only one of these isocyanates may be contained, or two or more thereof may be contained in combination.

The isocyanate may be any of aromatic, alicyclic, and aliphatic isocyanates, may be a bifunctional isocyanate having two isocyanate groups in one molecule, or may be a trifunctional or higher isocyanate having three or more isocyanate groups in one molecule, and these isocyanates may be used singly or in combination of two or more thereof.

Examples of the bifunctional isocyanate include: aromatic isocyanates such as 2,4-tolylene diisocyanate (TDI), 2,6-tolylene diisocyanate (TDI), m-phenylene diisocyanate, p-phenylene diisocyanate, 4,4'-diphenylmethane diisocyanate (MDI), 2,4'-diphenylmethane diisocyanate (MDI), 2,2'-diphenylmethane diisocyanate (MDI), xylylene diisocyanate, 3,3'-dimethyl-4,4'-biphenylene diisocyanate, and 3,3'-dimethoxy-4,4'-biphenylene diisocyanate; alicyclic isocyanates such as cyclohexane-1,4-diisocyanate, isophorone diisocyanate, dicyclohexylmethane-4,4'-diisocyanate, and methylcyclohexane diisocyanate; and aliphatic isocyanates such as butane-1,4-diisocyanate, hexamethylene diisocyanate, isopropylene diisocyanate, methylene diisocyanate, and lysine isocyanate. Examples of the bifunctional or higher isocyanate include polymethylene polyphenyl isocyanate (polymeric MDI). Examples of the trifunctional or higher isocyanate include 1-methylbenzoyl-2,4,6-triisocyanate, 1,3,5-trimethylbenzol-2,4,6-triisocyanate, biphenyl-2,4,4'-triisocyanate, diphenylmethane-2,4,4'-triisocyanate, methyldiphenylmethane-4,6,4'-triisocyanate, 4,4'-dimethyldiphenylmethane-2,2',5,5' tetraisocyanate, and triphenylmethane-4,4',4"-triisocyanate. Each of the isocyanates is not limited to one, and one or more of them may be used. For example, one aliphatic isocyanate and two aromatic isocyanates may be used in combination.

The number of functional groups of the isocyanate is preferably in the range of 2.0 to 2.8.

The isocyanate index (INDEX) of the urethane prepolymer is preferably 80 to 150, and more preferably 90 to 130. The isocyanate index is an equivalent ratio of isocyanate groups of isocyanate to reactive groups such as hydroxyl groups capable of reacting with isocyanate in polyols and a photopolymerizable monomer having a hydroxyl group. Thus, when the value is less than 100, it means that the reactive group such as a hydroxyl group is excessive as compared with the isocyanate group, and when the value is more than 100, it means that the isocyanate group is excessive as compared with the reactive group such as a hydroxyl group.

When the total amount of the polyol, the isocyanate, and the photopolymerizable monomer having a hydroxyl group is 100 parts by mass, the amount of the isocyanate is preferably 5 parts by mass or more and 40 parts by mass or less, more preferably 10 parts by mass or more and 35 parts by mass or less, and still more preferably 15 parts by mass or more and 30 parts by mass or less.

[Photopolymerizable Monomer Having Hydroxyl Group]

The photopolymerizable monomer having a hydroxyl group is a compound having a photoreactive group capable of reacting with the isocyanate. Examples of the "photoreactive group" include an alkenyl group, an alkynyl group, a vinyl group, an acrylic group, a methacrylate group, and an allyl group. The "photoreactive group" preferably includes an ethylenically unsaturated bond (—C═C—). Suitable examples of such a "photoreactive group", include a methacrylate group ($CH_2{=}C(CH_3)$—COO—) and an acrylate group ($CH_2{=}CH$—COO—).

The photopolymerizable monomer having a hydroxyl group is a compound having one or more hydroxyl groups in one molecule, and examples thereof include: monomers having an allyl ether group such as allyl ether glycol or hydroxyethyl allyl ether; monomers having a vinyl ether group such as 2-hydroxyethyl vinyl ether, diethylene glycol monovinyl ether, or 4-hydroxybutyl vinyl ether; and monomers having a (meth)acrylate group such as hydroxyethyl acrylate, hydroxypropyl acrylate, 4-hydroxybutyl acrylate, 2-hydroxyethyl methacrylate, 2-hydroxyethyl acrylate, or 2-hydroxypropyl methacrylate. The "(meth)acrylate" means acrylate and/or methacrylate. The alkyl (meth)acrylate having a hydroxyl group as the photopolymerizable monomer may be used singly or in combination of two or more thereof.

As the photopolymerizable monomer having a hydroxyl group, hydroxyethyl (meth)acrylate is preferable, and 2-hydroxyethyl acrylate (HEA) is more preferable.

When the total amount of the polyol, the isocyanate, and the photopolymerizable monomer having a hydroxyl group is 100 parts by mass, the amount of the photopolymerizable monomer having a hydroxyl group is preferably 2 parts by mass or more and 30 parts by mass or less, more preferably 5 parts by mass or more and 25 parts by mass or less, and still more preferably 8 parts by mass or more and 20 parts by mass or less.

The hydroxyl value of the photopolymerizable monomer having a hydroxyl group is preferably 10 to 1000 mgKOH/g, more preferably 20 to 500 mgKOH/g, and still more preferably 30 to 300 mgKOH/g.

[Particles of Silicone Resin]

The particles of silicone resin are not particularly limited. The shape of the particles of silicone resin may be substantially spherical, for example, a perfect sphere, a spheroid, or the like, and is more preferably a perfect sphere.

The average particle diameter of the particles of silicone resin is a particle diameter (median diameter) at an integrated value of 50% in a volume-based particle size distribution obtained by a laser diffraction/scattering method. The average particle diameter of the particles of silicone resin is preferably 0.1 μm or more and 50 μm or less, more preferably 1 μm or more and 30 μm or less, and still more preferably 3 μm or more and 20 μm or less.

The content of the particles of silicone resin in the coating layer is preferably 1 mass % or more and 60 mass % or less, more preferably 10 mass % or more and 50 mass % or less, and still more preferably 15 mass % or more and 40 mass % or less.

The particles of silicone resin are preferably distributed substantially uniformly throughout the coating layer 30. At least some of the particles of silicone resin are preferably exposed on the surface of the coating layer 30.

[Initiator]

The composition may contain an initiator used in the photopolymerization reaction. Examples of the initiator include acetophenone-based, benzophenone-based, and thioxanthone-based compounds. Examples of the acetophenone-based compounds include 2-hydroxy-1-{4-[4-(2-hydroxy-2-methyl-propionyl)-benzyl]phenyl}-2-methyl-propane-1-one, 1-[4-(2-hydroxyethoxy)phenyl]-2-hydroxy-2-methyl-1-propane-1-one, 2,2-dimethoxy-2-phenylacetophenone, 1,1-dichloroacetophenone, 4-(1-t-butyldioxy-1-methylethyl)acetophenone, 2-methyl-1-[4-(methylthio)phenyl]-2-morpholino-propane-1-one, 2-benzyl-2-dimethylamino-1-(4-morpholinophenyl)-butanone-1, diethoxyacetophenone, 2-hydroxy-2-methyl-1-phenylpropane-1-one, benzyldimethylketal, 4-(2-hydroxyethoxy)phenyl-(2-hydroxy-2-propyl)ketone, 1-hydroxycyclohexyl phenyl ketone, and 2-hydroxy-2-methyl-1-[4-(1-methylvinyl)phenyl]propanone oligomer.

Examples of the benzophenone-based compounds include 4-(1-t-butyldioxy-1-methylethyl)benzophenone, 3,3',4,4'-tetrakis(t-butyldioxycarbonyl)benzophenone, methyl o-benzoylbenzoate, 4-phenylbenzophenone, 4-benzoyl-4'-methyl-diphenylsulfide, 3,3',4,4'-tetra(t-butylperoxylcarbonyl) benzophenone, 2,4,6-trimethylbenzophenone, 4-benzoyl-N,N-dimethyl-N-[2-(1-oxo-2-propenyloxy)ethyl] benzenemetanaminium bromide, and (4-benzoylbenzyl) trimethylammonium chloride. Examples of the thioxanthone-based compounds include 2,4-dimethylthioxanthone, 2,4-diisopropylthioxanthone, 2-chlorothioxanthone, 2-isopropylthioxanthone, 4-isopropylthioxanthone, 2,4-diethylthioxanthone, 2,4-dichlorothioxanthone, 1-chloro-4-propoxythioxanthone, and 2-(3-dimethylamino-2-hydroxy)-3,4-dimethyl-9H-thioxanthone-9-one mesochloride.

[Monomer]

The composition may contain a photopolymerizable monomer. Examples of the monomer include compounds having an alkenyl group, an alkynyl group, a vinyl group, an acrylic group, a methacrylate group, an allyl group, and the like. Examples of the monomer include ethyl (meth)acrylate, methyl(meth)acrylate, n-propyl (meth)acrylate, isopropyl(meth)acrylate, n-butyl (meth)acrylate, isobutyl(meth)acrylate, tert-butyl (meth)acrylate, sec-butyl(meth)acrylate, 2-ethylhexyl (meth)acrylate, n-octyl(meth)acrylate, tridecyl (meth)acrylate, cyclohexyl(meth)acrylate, n-lauryl (meth) acrylate, dodecyl(meth)acrylate, stearyl (meth)acrylate, and isobornyl methacrylate. The monomer is preferably a compound having one or more ethylenically unsaturated groups in the molecule.

When the total amount of the polyol, the isocyanate, and the photopolymerizable monomer having a hydroxyl group is 100 parts by mass, the amount of the monomer is preferably 5.0 parts by mass or more and 60.0 parts by mass or less, more preferably 10.0 parts by mass or more and 50.0 parts by mass or less, and still more preferably 20.0 parts by mass or more and 40.0 parts by mass or less.

Additional Components

The composition may contain an additional component other than the above-described components as necessary. Examples of the additional component include a tackifier, a curing accelerator, a filler, a coupling agent, a rust inhibitor, an antioxidant, an ultraviolet absorber, a thickener, a plasticizer, an antibacterial agent, and a colorant.

[Elongation of Coating Layer 30]

The elongation of the coating layer 30 is preferably 5% or more, more preferably 10% or more, and still more preferably 15% or more as measured by a tensile test conforming to JIS K 6251 2010.

[Breaking Strength of Coating Layer 30]

The breaking strength of the coating layer 30 is preferably 5 N/mm$^2$ or more, more preferably 10 N/mm$^2$ or more, and still more preferably 15 N/mm$^2$ or more as measured by a tensile test conforming to JIS K 6251 2010.

In the various numerical ranges described in the specification, the upper limit values and the lower limit values may have any combinations, and all the combinations are described as preferable numerical ranges in the present specification.

2. Method for Producing Member

The production process for the member 10 includes an attachment step of attaching the raw material of the coating layer 30 to the foam layer 20, and an irradiation step of irradiating the raw material attached in the attachment step with light to cure the raw material through a photopolymerization reaction.

Specifically, the composition (mixed raw material) for the coating layer 30 described above is applied to a surface of the foam layer 20 using, for example, a gravure coater, and after the application, the composition is caused to cure (react) by ultraviolet irradiation.

The coating layer 30 is formed on the surface of the foam layer 20 using, for example, a composition obtained by synthesizing a urethane prepolymer from a polyol, an isocyanate, and a photopolymerizable monomer having a hydroxyl group, and then mixing a silicone resin, an initiator, a monomer, and the like.

A known method can be used for the synthesis of the urethane prepolymer. For example, the synthesis can be performed by charging a compound having two or more hydroxyl groups at a terminal, such as a polyol, into a closed-type reaction kettle equipped with a stirrer, a condenser, a vacuum dehydrator, and a nitrogen gas flow device, dehydrating the compound under reduced pressure, then blending an isocyanate, and causing the mixture to react under a nitrogen gas flow at 70° C. to 100° C. for 3 hours to 8 hours. In the synthesis of the urethane prepolymer, a urethanization catalyst such as an organotin compound or an amine may be used as necessary.

3. Toner Cartridge

Figure 2:
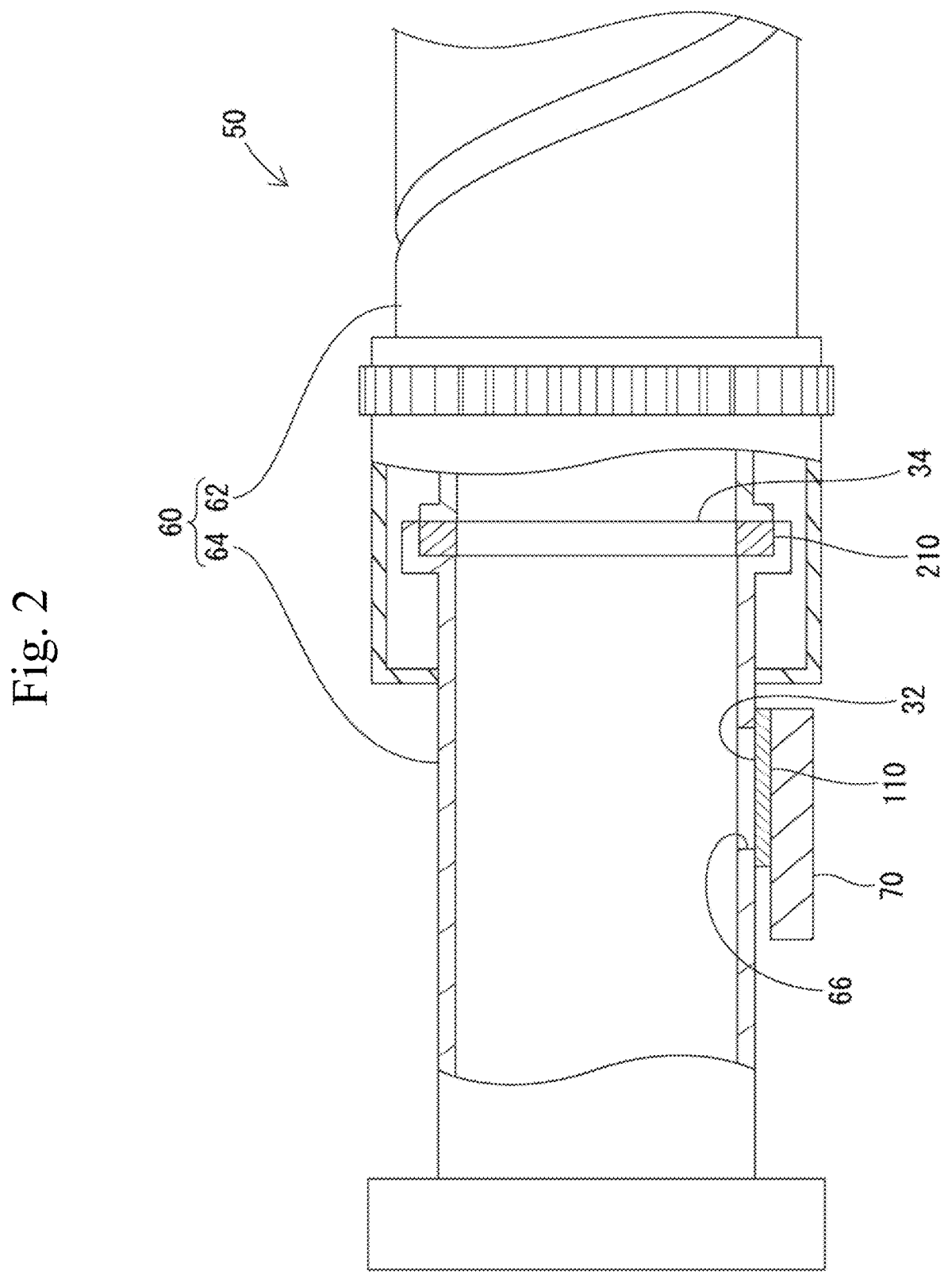

FIG. 2 is a partial sectional view of a toner cartridge 50 according to an embodiment. The toner cartridge 50 includes a container 60, a shutter 70, and toner seal members 110 and 210. The toner seal members 110 and 210 correspond to an example of the member 10. The container 60 houses toner. The container 60 includes a toner housing 62 and a discharge unit 64. The toner housing 62 houses toner. The toner housing 62 has a cylindrical shape and is rotatably connected to the discharge unit 64. The discharge unit 64 is provided with a discharge port 66 for discharging the toner.

The shutter 70 is supported by the discharge unit 64 in the vicinity of the discharge port 66 so as to be slidable along the outer surface of the discharge unit 64. The toner seal member 110 is assembled to the shutter 70. The toner seal member 110 is disposed on the discharge unit 64 side with respect to the shutter 70. The coating layer (see the coating layer 30 in FIG. 1) is disposed so as to be exposed on the outer surface side of the discharge unit 64.

Figure 3:
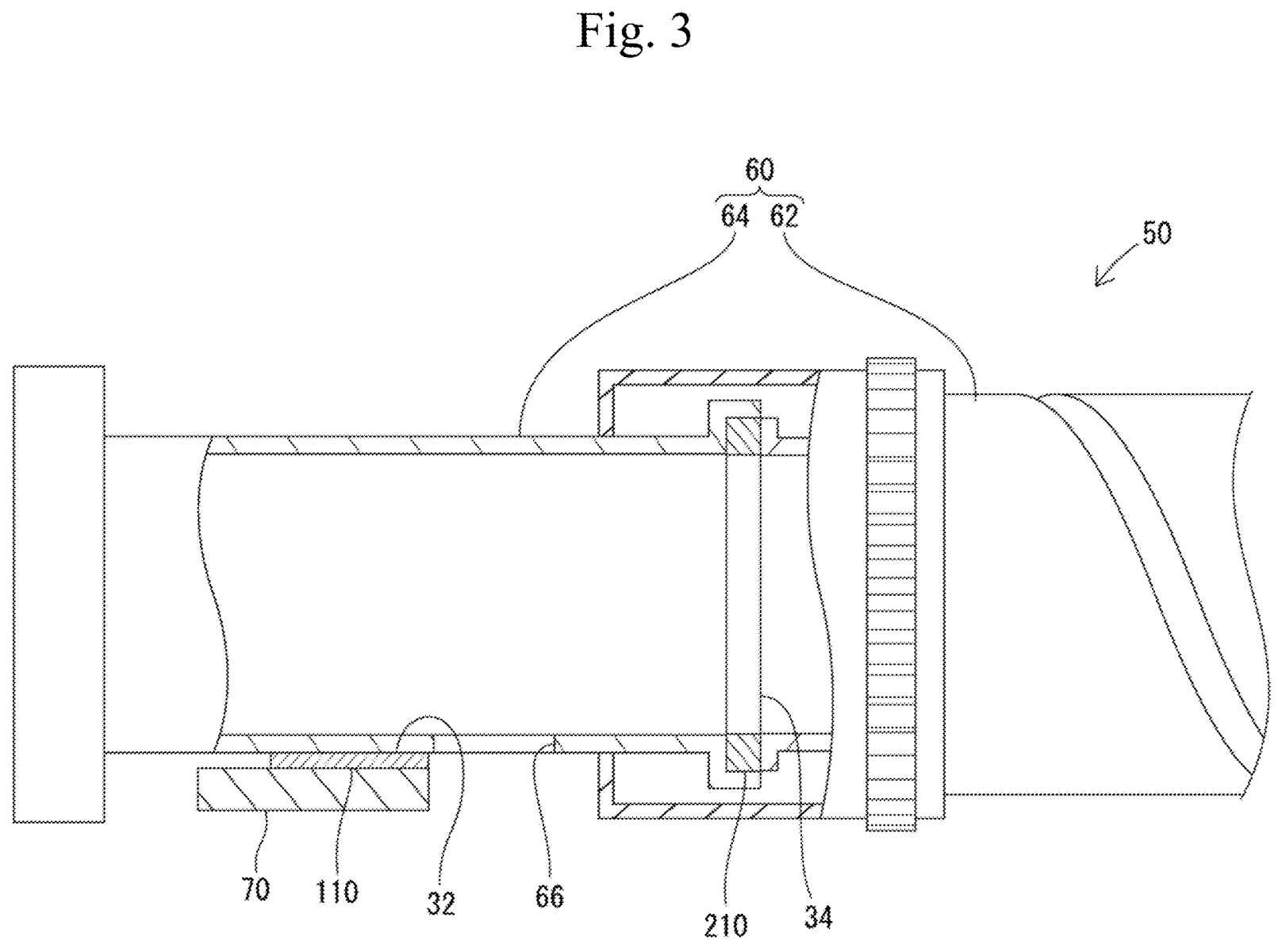

As illustrated in FIGS. 2 and 3, the toner seal member 110 slides along the outer surface of the discharge unit 64 as the shutter 70 slides. When the shutter 70 slides, the discharge port 66 is opened and closed by the toner seal member 110. The toner seal member 110 (more specifically, the coating layer) slides with respect to the outer surface of the discharge unit 64. An exposed surface 32 of the coating layer is a sliding surface with respect to the outer surface of the discharge unit 64.

The toner seal member 210 has a ring shape and is sandwiched between the open end of the toner housing 62 and the open end of the discharge unit 64. The toner seal member 210 seals a connection portion between the discharge unit 64 and the toner housing 62. The surface of the toner seal member 210 on the foam layer 20 side is fixed to the discharge unit 64 via an adhesive layer (not illustrated). A surface of the toner seal member 210 on the coating layer (see the coating layer 30 in FIG. 1) side is in contact with the toner housing 62 in a slidable state with respect to the toner housing 62. The toner seal member 210 is compressed in a thickness direction between the discharge unit 64 and the toner housing 62. An exposed surface 34 of the coating layer is a sliding surface with respect to the open end of the toner housing 62. The exposed surface of the coating layer may be a sliding surface with respect to the open end of the discharge unit 64.

4. Functions and Effects of Present Embodiment

In the present embodiment, the coating layer is produced using a polyol, an isocyanate, and a photopolymerizable monomer having a hydroxyl group as raw materials, whereby it is possible to provide a member that is improved in appropriate elongation and strength and is excellent in abrasion resistance. In addition, containing a silicone resin is contained in the raw materials of the coating layer, whereby it is possible to provide a member having excellent abrasion resistance, appropriate flexibility, and excellent slidability.

EXAMPLES

Next, the above embodiment will be described more specifically with reference to Examples and Comparative Examples.

1. Production of Member

In Examples 1 to 10 and Comparative Examples 1 to 4, compositions blended in the proportions listed in Tables 1 and 2 were prepared and attached to a foam layer. Thereafter, the composition was irradiated with light and cured by a photopolymerization reaction, whereby a coating layer was produced. In Tables 1 and 2, the numerical value of each component without description of a unit excluding the index represents parts by mass.

A Method for producing the members of Examples 1 to 10 and Comparative Examples 2 and 3 will be specifically described. A coating layer was formed on a surface of a foam layer by using a composition obtained by synthesizing urethane prepolymer from a polyol, an isocyanate, and a photopolymerizable monomer having a hydroxyl group, and then mixing a silicone resin, an initiator, and a monomer. Specifically, for the coating layer, the mixed composition was applied on a surface of the foam layer using a gravure coater, and after the application, the composition was caused to cure (react) by ultraviolet irradiation.

Synthesis of the urethane polymer was performed by, for example, charging a compound having two or more hydroxyl groups at a terminal, such as a polyol, into a closed-type reaction kettle equipped with a stirrer, a condenser, a vacuum dehydrator, and a nitrogen gas flow device, dehydrating the composition under reduced pressure, then blending an isocyanate, and causing the mixture to react under a nitrogen gas flow at 70° C. to 100° C. for 3 hours to 8 hours.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Polyol | Polyol 1 | — | — | — | — | — | — | — | — | — | — |
| | Polyol 2 | — | — | — | — | — | — | — | — | — | — |
| | Polyol 3 | — | — | — | — | — | — | — | — | — | — |
| | Polyol 4 | — | — | — | — | — | — | — | — | — | — |
| | Polyol 5 | 59.6 | 59.6 | 59.6 | 59.6 | 59.6 | 59.6 | 59.6 | 59.6 | 59.6 | 59.6 |
| Isocyanate | Isocyanate 1 | 26.5 | 26.5 | 26.5 | 26.5 | 26.5 | 26.5 | 26.5 | 26.5 | 26.5 | 26.5 |
| | Isocyanate 2 | — | — | — | — | — | — | — | — | — | — |
| Photopolymerizable monomer having hydroxyl group | | 13.9 | 13.9 | 13.9 | 13.9 | 13.9 | 13.9 | 13.9 | 13.9 | 13.9 | 13.9 |
| Index | | 100 | 100 | 100 | 100 | 100 | 100 | 100 | 100 | 100 | 100 |
| Total prepolymers | | 100 | 100 | 100 | 100 | 100 | 100 | 100 | 100 | 100 | 100 |
| Monomer | Monomer 2 | — | — | — | — | — | — | — | — | — | — |
| | Monomer 3 | — | — | — | — | — | — | — | — | — | — |
| | Monomer 4 | — | — | — | — | — | — | — | — | — | — |
| | Monomer 5 | — | — | — | — | — | — | — | — | — | — |
| | Monomer 6 | — | — | — | — | — | — | — | — | — | — |
| | Monomer 7 | 10.0 | 10.0 | 10.0 | 10.0 | 10.0 | 10.0 | 10.0 | 10.0 | 10.0 | 10.0 |
| | Monomer 8 | 10.0 | 10.0 | 10.0 | 10.0 | 10.0 | 10.0 | 10.0 | 10.0 | 10.0 | 10.0 |
| | Monomer 9 | 15.0 | 15.0 | 15.0 | 15.0 | 15.0 | 15.0 | 15.0 | 15.0 | 15.0 | 15.0 |
| Initiator | Initiator 1 | 2.5 | 2.5 | 2.5 | 2.5 | 2.5 | 2.5 | 2.5 | 2.5 | 2.5 | 2.5 |
| | Initiator 2 | — | — | — | — | — | — | — | — | — | — |
| Filler (mass %) | | 6 | 9 | 12.5 | 15 | 20.0 | 22.5 | 25.0 | 30.0 | 40.0 | 50.0 |
| Total | | 137.5 | 137.5 | 137.5 | 137.5 | 137.5 | 137.5 | 137.5 | 137.5 | 137.5 | 137.5 |
| Viscosity | (mPa · s) @25° C. | 448 | 472 | 544 | 656 | 1468 | 1886 | 2048 | 2256 | 2850 | 73500 |
| | Evaluation (score) | 1 | 1 | 1 | 1 | 1 | 7 | 1 | 1 | 1 | 0 |
| Pencil hardness | | B | B | B | B | B | B | B | B | B | B |
| Elongation (%) | | 21.9 | 23.0 | 25.3 | 24.6 | 27.3 | 25.7 | 24.9 | 28.2 | 24.4 | 25.8 |
| Breaking strength ($N/mm^2$) | | 20.2 | 18.9 | 18.7 | 17.2 | 15.0 | 15.5 | 14.3 | 14.5 | 13.4 | 12.0 |
| Bending | Evaluation | A | A | A | A | A | A | A | A | A | A |
| resistance | Score | 1 | 1 | 1 | 1 | 1 | 1 | 1 | 1 | 1 | 1 |
| Abrasion | Cycle | 10,000 | 15,000 | 15,000 | 15,000 | 70,000 | 100,000 | 100,000 | 100,000 | 100,000 | 100,000 |
| resistance | Evaluation (score) | 2 | 2 | 2 | 2 | 3 | 4 | 4 | 4 | 4 | 4 |
| Overall | Total score | 4 | 4 | 4 | 4 | 5 | 6 | 6 | 6 | 6 | 5 |
| evaluation | Evaluation | C | C | C | C | B | A | A | A | A | B |

TABLE 2

| | | Comparative Example 1 | Comparative Example 2 | Comparative Example 3 | Comparative Example 4 |
|---|---|---|---|---|---|
| Polyol | Polyol 1 | — | — | 76.3 | — |
| | Polyol 2 | — | 17.8 | — | — |
| | Polyol 3 | — | 8.9 | — | — |
| | Polyol 4 | — | 53.4 | — | — |
| | Polyol 5 | — | — | — | — |
| Isocyanate | Isocyanate 1 | — | 15.8 | 8.5 | — |
| | Isocyanate 2 | — | — | 6.4 | — |
| Photopolymerizable monomer having hydroxyl group | | — | 4.1 | 8.9 | — |
| Index | | — | 100 | 100 | — |
| Total prepolymers | | — | 100 | 100 | — |
| Monomer | Monomer 2 | 15 | — | — | 15 |
| | Monomer 3 | 65 | — | — | 65 |
| | Monomer 4 | 15 | — | — | 15 |
| | Monomer 5 | 2.5 | — | — | 2.5 |
| | Monomer 6 | 2.5 | — | — | 2.5 |
| | Monomer 7 | — | — | 10.0 | — |
| | Monomer 8 | — | — | 10.0 | — |
| | Monomer 9 | — | — | 15.0 | — |
| Initiator | Initiator 1 | — | — | 2.5 | — |
| | Initiator 2 | 7.5 | — | — | 7.5 |
| Filler (mass %) | | — | — | — | 40 |
| Total | | 107.5 | 100 | 137.5 | 107.5 |

TABLE 2-continued

| | | Comparative Example 1 | Comparative Example 2 | Comparative Example 3 | Comparative Example 4 |
|---|---|---|---|---|---|
| Viscosity | (mPa · s) @25° C. | 166 | 230 | 125 | 2670 |
| | Evaluation (score) | 1 | 1 | 1 | 1 |
| Pencil hardness | | B | H | B | H |
| Elongation (%) | | 21.9 | 2.4 | 20.2 | 186.7 |
| Breaking strength (N/mm$^2$) | | 20.2 | 20.2 | 25.5 | 8.2 |
| Bending resistance | Evaluation | B | A | A | B |
| | Score | 0 | 1 | 1 | 0 |
| Abrasion resistance | Cycle | 1000 | 1000 | 1000 | 1000 |
| | Evaluation (score) | 1 | 1 | 1 | 1 |
| Overall evaluation | Total score | 2 | 3 | 3 | 2 |
| | Evaluation | D | D | D | D |

Various pieces of information on each component in Tables 1 and 2 are shown in Table 3 below.

In Table 3, the contents in parentheses in the column of "Type" of Polyols 1 to 5 represents the raw material of each of Polyols 1 to 5. For example, the polyester polyol of Polyol 1 uses MPD and phthalic acid as raw materials.

"Mn" in Table 3 represents the number average molecular weight. Here, the number average molecular weight was measured by gel permeation chromatography (GPC) using polystyrene as a standard polymer. "Molecular weight" in Table 3 is determined by the sum of the atomic weights of the atoms constituting the molecule.

The column of "OHV" in Table 3 indicates the hydroxyl value.

Specific contents not described in the raw materials in Table 3 are shown below.

Polyol 1: polyester polyol (P-2020 manufactured by KURARAY CO., LTD.)

Polyol 2: polyester polyol (P-1020 manufactured by KURARAY CO., LTD.)

Polyol 3: polyester polyol (P-520 manufactured by KURARAY CO., LTD.)

Polyol 4: polycarbonate polyol (C-3090 manufactured by KURARAY CO., LTD.)

Polyol 5: polyester polyol (P-1010 manufactured by KURARAY CO., LTD.)

Initiator 1: IRGACURE127 manufactured by BASF SE

The filler as a raw material in Tables 1 and 2 is particles of silicone resin (TOSPEARL 2000B manufactured by Momentive Performance Materials Japan LLC) having an average particle diameter of 6 μm. The content of the filler (particles of silicone resin) represents the content in the coating layer.

TABLE 3

| Raw material name | | Type | Viscosity (mPa · s) @25° C. | Mn | Molecular weight | Number of functional groups | OHV (mgKOH/g) | NCO% |
|---|---|---|---|---|---|---|---|---|
| Polyol | Polyol 1 | Polyester polyol (MPD/phthalic acid) | 73,000@60° C. | 2000 | — | 2 | 56.1 | — |
| | Polyol 2 | Polyester polyol (MPD/phthalic acid) | 8,700@60° C. | 1000 | — | 2 | 112.2 | — |
| | Polyol 3 | Polyester polyol (MPD/phthalic acid) | 13,300@25° C. | 500 | — | 2 | 224.4 | — |
| | Polyol 4 | Polycarbonate polyol (MPD: 1,6 hexanediol = 9:1/diethyl carbonate) | 15,700@60° C. | 3000 | — | 2 | 37.4 | — |
| | Polyol 5 | Polyester polyol (MPD/adipic acid) | 1,500@25° C. | 1000 | — | 2 | 112.2 | — |
| Isocyanate | Isocyanate 1 | IPDI | 15@20° C. | — | 222.3 | 2 | — | 37.8 |
| | Isocyanate 2 | HDI | 25@20° C. | — | 168.2 | 2 | — | 49.9 |
| Monomer | Photopolymerizable monomer having hydroxyl group | Hydroxyethyl acrylate (HEA) | 6@25° C. | — | 116.1 | 1 | 483.2 | — |
| | Monomer 2 | Hexamethylene diacrylate | 7@25° C. | — | 226.27 | 2 | — | — |
| | Monomer 3 | Trimethylolpropane E0 modified triacrylate | — | — | 446 | 3 | — | — |
| | Monomer 4 | Tetraethylene glycol diacrylate | — | — | 700 | — | — | — |
| | Monomer 5 | Trimethylolpropane triacrylate | 60-110@25° C. | — | 296.32 | 3 | — | — |
| | Monomer 6 | Lauryl acrylate | 4@25° C. | — | 240.4 | 1 | — | — |
| | Monomer 7 | Isobornyl acrylate | 7.7@25° C. | — | 208.3 | 1 | — | — |
| | Monomer 8 | Phenoxyethyl acrylate | 9@25° C. | — | 192.2 | 1 | — | — |
| | Monomer 9 | Dimethylacrylamide | 1.3@20° C. | — | 99.1 | 1 | — | — |
| Initiator | Initiator 1 | Separately described | — | — | 340.4 | — | — | — |
| | Initiator 2 | Methyl 2-benzoylbenzoate | — | — | 240.3 | — | — | — |

2. Evaluation

Next, the obtained members of Examples and Comparative Examples were evaluated as follows.

[Viscosity]

The viscosity after mixing each raw material was measured at 25° C. using a B-type viscometer. Measurement was performed at a rotation speed of 30 rpm using spindle No. 63. The results are shown in the column of "(mPa·s) @25° C." in "Viscosity" in Tables 1 and 2.

Each member was evaluated in two grades as follows.

Evaluation score 1: less than 10,000

0: 10,000 or more

[Pencil Hardness]

The pencil hardness of the surface of the coating layer was measured conforming to JIS K5600-5-4:1999 using a pencil "UNI (registered trademark)" available from MITSUBISHI PENCIL COMPANY, LIMITED under a condition of a load of 200 g. The results are shown in the column of "Pencil hardness" in Tables 1 and 2.

[Elongation]

Each of the compositions blended in the proportions in Tables 1 and 2 was applied onto a release PET film using a roll coater so as to have a thickness of 0.1 mm. The surface of the composition after application was covered with a release PET film and caused to cure (react) by ultraviolet irradiation. A sample of dumbbell-shaped No. 3 was punched out from the cured composition, the release PET film was peeled off, a tensile test was performed conforming to JIS K 6251 2010, and the elongation at break was measured. The results are shown in the column of "Elongation (%)" in Tables 1 and 2.

[Breaking Strength]

Each of the compositions blended in the proportions in Tables 1 and 2 was applied onto a release PET film using a roll coater so as to have a thickness of 0.1 mm. The surface of the composition after coating was covered with a release PET film and irradiated with ultraviolet rays to be cured (reacted). A sample of dumbbell-shaped No. 3 was punched out from the cured composition, the release PET film was peeled off, a tensile test was performed conforming to JIS K 6251 2010, and the breaking strength was measured. The results are shown in the column of "Breaking strength ($N/mm^2$)" in Tables 1 and 2.

[Bending Resistance]

Each of the members of Examples and Comparative Examples with a double-sided tape attached to the side opposite to the sliding surface (the surface of the coating layer) was attached to a right angle portion of 90°. The surface state (presence or absence of cracks or the like) of the coating layer was visually checked.

The evaluation was based on the following criteria.

"A": The surface state is good (no crack or the like is present).

"B": Surface state is poor (a crack or the like is present)

Each member was evaluated in two grades as follows.

Evaluation score 1: Evaluation is "A"

0: Evaluation is "B"

[Abrasion Resistance]

A ring-shaped sample having an inner diameter of 33 mm and an outer diameter of 39 mm was punched out from the member of each of Examples and Comparative Examples to which a double-sided tape was attached on the side opposite to the sliding surface (the surface of the coating layer). The sample was attached to a jig (jig corresponding to the toner housing 62 and the discharge unit 64 illustrated in FIG. 2) at a compression rate of 42%, and rotated by 180° every 3 seconds at a rotation speed of 50 rpm. The surface state (presence or absence of rupture or the like) of the coating layer was visually checked. The number of cycles at which the surface state becomes poor (occurrence of rupture or the like) when the rotation at 180° is taken as 1 cycle is shown in the column of "Cycle" of "Abrasion resistance" in Tables 1 and 2.

Each member was evaluated in five grades as follows.

Evaluation Score

4: Surface state is poor (occurrence of rupture or the like) with 100,000 or more cycles 3: Surface state is poor (occurrence of rupture or the like) with 50,000 or more and less than 100,000 cycles 2: Surface state is poor (occurrence of rupture or the like) with 10,000 or more and less than 50,000 cycles 1: Surface state is poor (occurrence of rupture or the like) with 1000 or more and less than 10,000 cycles 0: Surface state is poor (occurrence of rupture or the like) with less than 1000 cycles

OVERALL EVALUATION

Each of Examples and Comparative Examples was comprehensively evaluated based on the evaluation score of viscosity, the evaluation score of bending resistance, and the evaluation score of abrasion resistance.

The evaluation was based on the following criteria.

"A": Total score is 6 points

"B": Total score is 5 points

"C": Total score is 4 points

"D": Total score is 3 points or less

3. Results

Examples 1 to 10 satisfy the following requirement (a). Comparative Examples 1 to 4 do not satisfy the following requirement (a).

Requirement (a): The coating layer is produced using a polyol, an isocyanate, a photopolymerizable monomer having a hydroxyl group, and a silicone resin as raw materials.

In Examples 1 to 10, the "Evaluation score" of the "Abrasion resistance" was 2-4. In Comparative Examples 1 to 4, the "Evaluation score" of the "Abrasion resistance" was 1. Examples 1 to 10 were able to improve the abrasion resistance by satisfying the requirement (a).

In Examples 1 to 10, the "Overall evaluation" was "A" to "C". In Comparative Examples 1 to 4, the "Overall evaluation" was "D". Examples 1 to 10 had good balance between the viscosity, the bending resistance, and the abrasion resistance by satisfying the requirement (a).

4. Effects of Examples

According to the above Examples, a member excellent in abrasion resistance was able to be provided. A member having a good balance between viscosity, bending resistance, and abrasion resistance was able to be provided.

The present disclosure is not limited to the embodiments detailed above, and various modifications or changes can be made within the scope indicated in the claims of the present disclosure.

The invention claimed is:

1. A toner seal member, comprising:

a foam layer; and a coating layer, the coating layer being exposed, wherein the coating layer is obtained from raw materials including a polyol, an isocyanate, a photopolymerizable monomer having a hydroxyl group, and a silicone resin as raw materials.

2. The toner seal member according to claim 1, wherein the polyol contains a polyester polyol.

3. The toner seal member according to claim 1, wherein the photopolymerizable monomer having a hydroxyl group contains 2-hydroxyethyl acrylate.

4. The toner seal member according to claim 1, wherein the coating layer contains particles of the silicone resin, and a content of the particles of the silicone resin in the coating layer is 20 mass % or more and 60 mass % or less.

5. The member according to claim 1, wherein the raw materials of the coating layer further include a photopolymerizable monomer having no hydroxyl group, and the photopolymerizable monomer having no hydroxyl group contains one or more selected from a group consisting of isobornyl acrylate, phenoxyethyl acrylate, and dimethylacrylamide.

6. The member according to claim 1, wherein the member is configured such that, when the member is attached to a jig at a compression rate of 42% and rotated by 180° every 3 seconds at a rotation speed of 50 rpm such that the coating layer slides with respect to the jig, a number of cycles at which a surface state of the coating layer becomes poor is 10,000 or more.

7. The member according to claim 1, wherein the member is configured such that, when the member is attached to a jig at a compression rate of 42% and rotated by 180° every 3 seconds at a rotation speed of 50 rpm such that the coating layer slides with respect to the jig, a number of cycles at which a surface state of the coating layer becomes poor is 10,000 or more, and elongation of the coating layer is 5% or more as measured by a tensile test conforming to JIS K 6251 2010.

8. The member according to claim 1, wherein the member is configured such that, when the member is attached to a jig at a compression rate of 42% and rotated by 180° every 3 seconds at a rotation speed of 50 rpm such that the coating layer slides with respect to the jig, a number of cycles at which a surface state of the coating layer becomes poor is 10,000 or more, and breaking strength of the coating layer is 5 $N/mm^2$ or more as measured by a tensile test conforming to JIS K 6251 2010.

9. A toner cartridge comprising the member according to claim 1.

10. The member according to claim 1, wherein an elongation of the coating layer is 5% or more as measured by a tensile test conforming to JIS K 6251 2010.

11. The member according to claim 1, wherein a breaking strength of the coating layer is 5 $N/mm^2$ or more as measured by a tensile test conforming to JIS K 6251 2010.

* * * * *